United States Patent
Maciaszek

[11] 4,107,073
[45] Aug. 15, 1978

[54] PULP AND PAPERMAKING ADDITIVE

[75] Inventor: Joseph A. Maciaszek, Bridgeview, Ill.

[73] Assignee: Nalco Chemical Company, Oak Brook, Ill.

[21] Appl. No.: 826,433

[22] Filed: Aug. 22, 1977

Related U.S. Application Data

[63] Continuation-in-part of Ser. No. 778,414, Mar. 17, 1977, abandoned.

[51] Int. Cl.$^2$ ............................................. B01J 13/00
[52] U.S. Cl. ................................... 252/321; 252/358; 162/72; 162/75; 162/80; 162/173; 162/179
[58] Field of Search .................. 252/321, 358; 162/72, 162/75, 80, 173, 179

[56] References Cited

U.S. PATENT DOCUMENTS

| | | | |
|---|---|---|---|
| 3,730,907 | 5/1973 | Shane et al. ...................... | 252/321 X |
| 4,021,365 | 5/1977 | Sinka et al. ........................... | 252/321 |
| 4,032,473 | 6/1977 | Berg et al. ............................ | 252/358 |

Primary Examiner—Benjamin R. Padgett
Assistant Examiner—E. Suzanne Parr
Attorney, Agent, or Firm—John G. Premo; Robert A. Miller; John S. Roberts

[57] ABSTRACT

An antifoam/defoam composition used also as a drainage aid in pulp and papermaking process lines which consists of a water-base composition useful in the pH range 7.0–9.0. The milieu in which the composition is utilized such as e.g. black liquor, may be kept at a pH of 4.0–12.0. The composition is as follows:

Hydrophobic silica
Bisamide of the following formula:

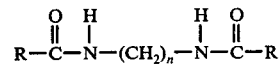

where
  $n$ is an integer from 1 to 6; and
  R is a saturated or unsaturated, straight or branched chain hydrocarbyl group having from 5 to 22 carbon atoms.
Acid containing crosslinked copolymer of acrylic acid
Dioctyl sulfosuccinate
Paraffin oil
Water More particular formulae are also set out below:

| | | |
|---|---|---|
| (A) | Hydrophobic silica | 0–30% |
| | Ethylene-bis-stearamide | .001–50% |
| | Acid containing crosslinked acrylic acid polymer | .05–10% |
| | Dioctyl sulfosuccinate | .05–10% |
| | Paraffin oil | .001–99% |
| | H$_2$O | .001–99% |
| (B) | Hydrophobic silica | 4–12% |
| | Ethylene-bis-stearamide | 4–12% |
| | Acid containing crosslinked acrylic acid polymer | .25–3% |
| | Dioctyl sulfosuccinate | .25–3% |
| | Paraffin oil | 41–35% |
| | H$_2$O | 50–40% |
| (C) | Hydrophobic silica | 4.5% |
| | Ethylene-bis-stearamide | 1% |
| | Acid containing crosslinked acrylic acid polymer | 1% |
| | Dioctyl sulfosuccinate | 1% |
| | Paraffin oil | 42.5% |
| | H$_2$O | 50% |

10 Claims, No Drawings

PULP AND PAPERMAKING ADDITIVE

This is a continuation-in-part of Ser. No. 778,414 filed Mar. 17, 1977, and now abandoned.

The present invention is directed to an antifoam/defoam emulsion composition which is useful both in the pulping processes and papermaking processes and finds specific utility as a brown stock wash aid and in the screen room following the washers in the pulping process as well as in the machine room of a papermaking process. Furthermore, these same compositions have utility as drainage aids and thus apparently have a synergistic effect considering the process as a whole.

It is noted that chemical pulping may be defined as the treatment (cooking) of wood with chemical reagents to a point where fibers can be easily separated from each other — that is, pulped.

In general, foaming is a problem in the handling and utilization of Kraft paper slurries, sulfide pulp slurries and groundwood pulp slurries in papermaking machines, including machines used prior to formation of the fibrous matter, such as beaters, refiners, mixers, and flow boxes. Additionally, foam on the fiber particle hinders adequate drainage.

The present additive compositions, which are useful in the pH range 7.0–9.0 which may be adjusted by outside means using an alkali metal hydroxide, ammonia, or an organic base, have the following broad composition:

Hydrophobic silica
Bisamide of the following formula:

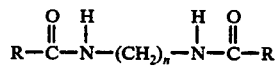

where
n is an integer from 1 to 6; and
R is a saturated or unsaturated, straight or branched chain hydrocarbyl group having from 5 to 22 carbon atoms.
Acid containing crosslinked copolymer of acrylic acid
Dioctyl sulfosuccinate
Paraffin oil
Water Narrower compositions useful from field studies are as follows:

| | | |
|---|---|---|
| (A) | Hydrophobic silica | 0–30% |
| | Ethylene-bis-stearamide | .001–50% |
| | Acid containing crosslinked acrylic acid polymer | .05–10% |
| | Dioctyl sulfosuccinate | .05–10% |
| | Paraffin oil | .001–99% |
| | H₂O | .001–99% |
| (B) | Hydrophobic silica | 4–12% |
| | Ethylene-bis-stearamide | 4–12% |
| | Acid containing crosslined acrylic acid polymer | .25–3% |
| | Dioctyl sulfosuccinate | .25–3% |
| | Paraffin oil | 41–35% |
| | H₂O | 50–40% |
| (C) | Hydrophobic silica | 4.5% |
| | Ethylene-bis-stearamide | 1% |
| | Acid containing crosslinked acrylic acid polymer | 1% |
| | Dioctyl sulfosuccinate | 1% |
| | Paraffin oil | 45.5% |
| | H₂O | 50% |

PRIOR ART

U.S. Pat. No. 3,923,683 Michalski (Nalco) discusses antifoams which include hydrophobic silica, a bisamide, and a silicone oil. A difficulty with these compositions has been that the compositions are too viscous both in use and storage. A particular point of utility in pulping emphasized in the patent is a brown stock wash aid in the sulfate or Kraft process to reduce foaming in the evaporation of black liquor to remove or recover chemicals.

In the present composition it has been found that the addition of dioctyl sulfosuccinate or its dinonyl or dihexyl homologs added to the effectiveness of the antifoam emulsion with a continuous phase of water by reducing the viscosity. Additionally, the present invention contains an acrylic polymer, such as the acid form of a methacrylate copolymer, which adds a thickening suspending agent so that the total formulation will not separate and settle. Thus, the present formulations have the advantages of low viscosity, stability, and suspension of the solids in the product.

It has been further found that the factor of brightness reversion plays a part in the novelty of the present compositions. For instance after storage of bleached pulp the brightness reversion will be reduced over the prior art of U.S. Pat. No. 3,923,683 above.

HYDROPHOBIC SILICA

The first component of the antifoaming composition of this invention comprises a hydrophobic silica. Hydrophobic silicas are known precisely by that designation in the art, but nonetheless hydrophobic silica is defined herein as a finely divided silica (e.g. that precipitated from silica hydrosol) treated in an oil or some other hydrophobic material with a suitable silicone which renders the silica particles themselves hydrophobic.

The hydrophobic silica utilized in this invention will desirably have an average particle size less than about 10 microns and preferably less than about 5 microns. Most preferred is an averge particle size from about 0.02 microns to about 1.0 micron. Hydrophobic silicas are easily prepared by methods known to those skilled in the art. The preferred hydrophobic silica of this invention is prepared by precipitating colloidal amorphous silica from sodium silicate solution and exposing said silica to methylchlorosilane vapors until reaction at the surface of the silica is complete. Various other types of hydrophobic silicas as well as other techniques are described in detail in U.S. Pat. No. 3,408,306.

A particularly useful hydrophobic silica is 15.5% hydrophobic silica plus paraffin oil and is a silica which has been treated with a polydimethyl siloxane. This renders the surface of the silica hydrophobic or impervious to water. The surface of the silica may be from 50 to 300M²/gram.

AMIDE

The amides which are used in this invention are of the bisamide type having the following structure:

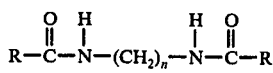

where
n is an integer from 1 to 6; and

R is a saturated or unsaturated, straight or branched chain hydrocarbyl group having from 5 to 22 carbon atoms.

Preferably, n is 1 and R contains from 12-22 carbon atoms and is a saturated hydrocarbyl group. A typical preferred compound is ethylene-bis-stearamide.

Typical saturated bisamides which can be employed in this invention are listed below:
methylene bis caprylamide
methylene bis pelargonamide
ethylene bis capramide
methylene bis lauamide
methylene bis myristamide
methylene bis palmitamide
methylene bis stearamide
ethylene bis arachidamide
ethylene bis behenamide Typical unsaturated amides which can be employed in this invention are listed below:
hexylene bis linolenamide
propylene bis linoleamide
propylene bis oleamide
pentylene bis brucamide A particularly preferred amide is ethylene-bis-stearamide.

DIOCTYL SULFOSUCCINATE

This compound is described as di(2-ethylhexyl) sodium sulfosuccinate and is know as an anionic surface active agent.

In the compositions of this invention the next adjacent homologs, dinonyl and dihexyl, may also be utilized and substituted for the dioctyl sulfosuccinate (DOSS). Further the soluble alkali metal and ammonium salts of the sulfosuccinate are considered as equivalent to the free acid and these salts are included in the defination of DOSS.

It has been found that the dioctyl sulfosuccinate in the compoistion reduced the viscosity in the emulsion. The amount of dioctyl sulfosucciante (DOSS) in the composition may range from about 0.05-10%, with a preferred range of 0.25-3%, and a most preferred value of 1.0% of the emulsion weight.

It has also been found that DOSS exhibits inverse solubility in aqueous systems with increasing temperature and the use of DOSS, expecially in brown stock wash aids, screen room, and machine room antifoams and defoamers, acts as a super spreading and wetting agent and as a dispersant which helps to reduce pitch in pulp and paper mills.

ACID CONTAINING CROSSLINKED ACRYLIC ACID POLYMER

A particularly useful copolymer is Aquasol ASE 60 (Rohm & Haas) defined as an acid containing crosslinked acrylic emulsion copolymer. Also useful are acrylic acid and copolymers thereof that contain at least 20 or 40% of acrylate. Preferred are the acrylamide acrylate copolymers. Another type is acrylamide maleic anhydride or acrylamide-itaconic, acrylamide fumaric. Molecular weight is at least 100,000 and preferably 1 million or more.

The function of the acrylic copolymer is vital to the present formulation in that without it the entire formulation shows instability and separates so that it is commerically unusable. Furthermore, the polymer is sensitive to pH and must be up to the range of about 7.0-9.0 to be useful. The polymer is used in amounts of 0.05-10% of the water-based emulsion compositions and a preferred range is from 0.25-3.0%, and a most preferred value of 1.0% based on the weight of the emulsion.

PARAFFIN OIL

The preferred oil is a paraffin oil and may be a mixture of alkanes from paraffin distillates. The individual compounds have the generic formula $C_nH_{2n+2}$.

WATER

This component, which forms the basis for the water-based emulsion, may be utilized as ordinary tap or in a more purified form.

pH

It has been found that in the practice of this invention a pH of 7.0-9.0 is favorable for the utilization of the antifoam and drainage aid composition. Furthermore, the milieu in which the composition is used such as black liquor may be kept at a pH of 4.0-12.0.

DOSAGE

This composition can be utilized in a dosage range of 0.25-2.0 lbs/ton of oven dried pulp. Additionally, for example, Composition C (ante) may be used straight further diluted with water 1:1 as a brown stock wash aid or diluted 1:2 or 1:3 with water for use in the screen room or machine room.

ACTIVITY AS A DRAINAGE AID

In addition to the activity set out above as a defoamer, it has been found that the compositions of the present invention also have activity in promoting drainage, for example, in the pulp bleaching process where foam on the fibers hinders drainage. It has been found that, where these compositions are utilized, an improvement in pulp mat consistency coming off the caustic extractor of from the usual 8-12% to 11-15% or about 30% has been realized.

EXAMPLE 1

In the pulping process a trial or test was made utilizing Composition C as a defoamer and also as a drainage aid in the caustic extraction and chlorine stages.

The results noted that there was approximately a 3% improvement in pulp mat consistency coming off the chlorine extraction. As the pulp came off the drum in the caustic extraction stage, the sample was removed from the pulp and weighed. It was washed, dried, and weighed and the amount of pulp present was determined. In a consistent series the test showed that the untreated had about 9% consistency and the treated pulp 12% consistency. The conclusion was that this meant less chemical carryover and that the demand for chlorine in the next stage should be reduced.

This defoam/antifoam composition with drainage aid capabilities is comprised of a blend of hydrophobic silica, bisamide, acid containing crosslinked copolymer of acrylic acid, dioctyl sulfosuccinate, and paraffin oil in a water-based emulsion.

EXAMPLE 2

Effect of the Acrylic Copolymer Additive in the Composition

Run 1 had Formulation C with the acrylic copolymer. In addition to the formulation of materials, the pH was controlled with 7.0 drops of 50% caustic NaOH in 100 grams. The results showed good shelf stability.

Run 2 used Formulation C without the acrylic acid polymer. Immediate or near immediate separation occurred.

Run 3 was prepared in the same manner as Run 1 but there was no control of the pH. The results showed that it, too, separated and was unusable.

Run 4 was formulated in the same manner as Run 1 but in the formulation the pH was adjusted to 7.5. The results showed good stability. The formulation used in Run 4 was:
- 30% hydrophobic silica (5% silica in paraffin oil)
- 18% bisamide (5% ethylene bis stearamide in paraffin oil)
- 1% acrylic copolymer
- 1% dioctyl sulfosuccinate (sodium salt)
- Caustic was added to adjust the pH to 7.5.

Additional runs were made utilizing the following amended composition with additional polymer and the formulation was also satisfactory and stable:
- 20% silica
- 10% amide (5% ethylene bis stearamide in paraffin oil)
- 2% polymer
- 1% dioctyl sulfosuccinate
- 67% water

I claim:

1. An antifoam and drainage aid composition useful in pulping and papermaking processes which consists of a water-based emulsion composition as follows:
   (a) Hydrophobic silica
   (b) Bisamide of the following formula:

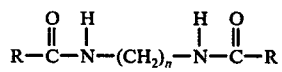

where
   $n$ is an integer from 1 to 6; and
   R is a saturated or unsaturated, straight or branched chain hydrocarbyl group having from 5 to 22 carbon atoms
   (c) Acid containing crosslinked copolymer of acrylic acid
   (d) Dioctyl sulfosuccinate
   (e) Paraffin oil
   (f) Water 2. The antifoam and drainage aid composition according to claim 1 wherein the composition is as follows:

| | |
|---|---|
| Hydrophobic silica | 0–30% |
| Ethylene-bis-stearamide | .001–50% |
| Acid containing crosslinked acrylic acid polymer | .05–10% |
| Dioctyl sulfosuccinate | .05–10% |
| Paraffin oil | .001–99% |
| H$_2$O | .001–99% |

3. The antifoam and drainage aid composition according to claim 1 wherein the composition is as follows:

| | |
|---|---|
| Hydrophobic silica | 4–12% |
| Ethylene-bis-stearamide | 4–12% |
| Acid containing crosslinked acrylic acid polymer | .25–3% |
| Dioctyl sulfosuccinate | .25–3% |
| Paraffin oil | 41–35% |
| H$_2$O | 50–40% |

4. The antifoam and drainage aid composition according to claim 1 wherein the composition is as follows:

| | |
|---|---|
| Hydrophobic silica | 4.5% |
| Ethylene-bis-stearamide | 1% |
| Acid containing crosslinked acrylic acid polymer | 1% |
| Dioctyl sulfosuccinate | 1% |
| Paraffin oil | 42.5% |
| H$_2$O | 50% |

5. The antifoam and drainage aid composition acording to claim 1 wherein the bisamide is ethylene-bis-stearamide.

6. A method of adding an antifoam and drainage aid composition to the slurry and waste water at a pH of 4.0–12.0 of brown stock wash, screen room, and machine room of a pulp and paper process line which consists in adding an effective amount of an antifoam and drainage aid, said aid having a pH of 7.0–9.0 according to the following composition:
   (a) Hydrophobic silica
   (b) Bisamide of the following formula:

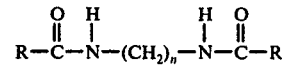

where
   $n$ is an integer from 1 to 6; and
   R is a saturated or unsaturated, straight or branched chain hydrocarbyl group having from 5 to 22 carbon atoms
   (c) Acid containing crosslinked copolymer of acrylic acid
   (d) Dioctyl sulfosuccinate
   (e) Paraffin oil
   (f) Water 7. The method according to claim 6, wherein the composition is as follows:

| | |
|---|---|
| Hydrophobic silica | 0–30% |
| Ethylene-bis-stearamide | .001–50% |
| Acid containing crosslinked acrylic acid polymer | .05–10% |
| Dioctyl sulfosuccinate | .05–10% |
| Paraffin oil | .001–99% |
| H$_2$O | .001–99% |

8. The method according to claim 6, wherein the composition is as follows:

| | |
|---|---|
| Hydrophobic silica | 4–12% |
| Ethylene-bis-stearamide | 4–12% |
| Acid containing crosslinked acrylic acid polymer | .25–3% |
| Dioctyl sulfosuccinate | .25–3% |
| Paraffin oil | 41–35% |
| H$_2$O | 50–40% |

9. The method according to claim 6, wherein the composition is as follows:

| | |
|---|---|
| Hydrophobic silica | 4.5% |
| Ethylene-bis-stearamide | 1% |
| Acid containing crosslinked acrylic acid polymer | 1% |
| Dioctyl sulfosuccinate | 1% |
| Paraffin oil | 42.5% |
| H$_2$O | 50% |

10. The method according to claim 6, wherein the bisamide is ethylene-bis-stearamide.